United States Patent [19]

Faita et al.

[11] Patent Number: 5,578,388
[45] Date of Patent: *Nov. 26, 1996

[54] ELECTROCHEMICAL CELL PROVIDED WITH ION EXCHANGE MEMBRANES AND BIPOLAR METAL PLATES

[75] Inventors: Giuseppe Faita, Novara; Claudio Mantegazza, Saronno, both of Italy

[73] Assignee: De Nora Permelec S.p.A., Italy

[*] Notice: The term of this patent shall not extend beyond the expiration date of Pat. No. 5,482,792.

[21] Appl. No.: 457,987

[22] Filed: Jun. 1, 1995

Related U.S. Application Data

[63] Continuation of Ser. No. 227,006, Apr. 13, 1994, Pat. No. 5,482,792.

[30] Foreign Application Priority Data

Apr. 30, 1993 [IT] Italy .................................. MI93A0857

[51] Int. Cl.[6] .................................................. H01M 8/10
[52] U.S. Cl. ........................... 429/30; 429/26; 429/34
[58] Field of Search ................................ 429/30, 26, 34

[56] References Cited

U.S. PATENT DOCUMENTS 4,657,650  4/1987  Vauss ..................................... 204/242
4,826,741  5/1989  Aldhart .................................... 429/19
5,162,165  1/1992  Bianchi .................................... 429/30

Primary Examiner—John Niebling
Assistant Examiner—Brendan Mee
Attorney, Agent, or Firm—Bierman & Muserlian

[57] ABSTRACT

A membrane electrochemical cell, in particular a fuel cell, of an improved type comprising a multiplicity of cell elements, each element made up of bipolar plates, current collectors, electrodes and membranes, wherein the function of electric current transmission through the cell elements, the release of heat towards the outside environment, the distribution of electric current to the electrodes and membranes, the removal of heat from the electrodes and membranes and the distribution of the reactants and products are performed by distinct components, in particular bipolar plates for the first two and porous electroconductive collectors for the others. The bipolar plates may have flat surfaces without grooves and are preferably manufactured with aluminum, titanium or alloys thereof, through cheap mass productions techniques; the bipolar plates are used together with collectors provided with deformability, residual resiliency and high porosity. Said collectors advantageously act also as distributors of the gaseous reactants and of the products.

23 Claims, 5 Drawing Sheets

ELECTROCHEMICAL CELL PROVIDED WITH ION EXCHANGE MEMBRANES AND BIPOLAR METAL PLATES

This application is a continuation of U.S. patent application Ser. No. 227,006 filed Apr. 13, 1994, now U.S. Pat. No. 5,482,792.

DESCRIPTION OF THE PRIOR ART

Fuel cells fed with reactants containing hydrogen and oxygen in the anodic (negative polarity) and cathodic (positive polarity) compartments respectively, are apparatuses characterized in that they produce electric current with energy conversion efficiency referred to the heating value of fuel double or even triple with respect to those typical of an internal combustion engine. Further some fuel cells may also operate at relatively low temperatures, indicatively in the range of 50°–200° C., which make them extremely useful for intermittent operations such as those typical of both small on-site generation of electric energy (for example as required by mechanical workshops) and on-board power generation for transportation means. These applications are also favoured by the property of the fuel cells of being absolutely noiseless, apart from the minor noise connected to the operation of auxiliary apparatuses, such as fans and pumps for the cooling circuit. Among the various low-temperature fuel cells, particularly attractive for the above mentioned purposes is the type based on the use of ion exchange membranes, in particular perfluorinated sulphonic membranes. The use of ion exchange membranes, which substitute the conventional liquid electrolytes, permits the construction of very simple fuel cells due to the absence of the circulation, and make-up systems which are necessary with liquid electrolytes, as well as problems of corrosion caused by the electrolytes themselves. Said absence of electrolyte results in a wider choice of materials possibly lighter and more economical. The use of ion exchange membranes, which must be actually considered as solid electrolytes, poses the problem of the nature of the interface with the porous electrodes fed with hydrogen and oxygen. In the case of the liquid electrolytes, due to the capillary forces, they penetrate into the pores of the porous electrodes thus forming a meniscus wherein the triple contact between liquid, gas and catalyst of the electrode occurs, as it is required for causing the high-speed consumption of hydrogen and oxygen respectively.

In the case of ion exchange membranes, the contact between the membranes themselves and the porous electrodes is necessarily influenced by the fact that the two components are solid substances and therefore the area of triple contact results are limited to the areas of real physical contact. Therefore the capillarity phenomena which contribute in such a determinant way with the liquid electrolytes are not possible. As a consequence the consumption speed of hydrogen and oxygen is rather small. This problem is overcome by heat-pressing the porous electrodes made of electrocatalytic particles onto the membranes, as described in U.S. Pat. No. 3,134,697. Further improvements have been obtained by adding electroconductive particles, polymeric binders and in particular materials capable of favouring the migration of protons as claimed in U.S. Pat. No. 4,876,115.

However, notwithstanding these improvements and implementations, the ion exchange membrane fuel cells have not yet achieved industrial success. One of the reasons for this difficulty resides in the fact that the designs of the membrane fuel cells known in the art have not given so far a satisfactory reply to the problems of safety and fabrication costs, bound to the types of materials used for the construction, as well as to the need for mass production and assembling simplicity. This situation is due to the fact that the design of the membrane fuel cell must solve an objectively complex technical problem, that is providing the anodes at the same time with a homogeneous distribution of both electric current and reactants, a complete contact with the membrane and an effective withdrawal of the heat produced by the inefficiencies of the system (overvoltages, ohmic drops). The design of the fuel cell of the prior art is usually based on the fact that the electrodes must constitute a unitary structure with the membrane, obtained as aforesaid by heat-pressing the various components. This unitary structure intrinsically ensures the best continuous contact between the membrane and the electrodes. On these bases, the design of the bipolar plates has been finalized to perform the other tasks of gas and electric current distribution and heat withdrawal. The best preferred geometry a bipolar plate provided with grooves, in particular with the grooves of one side oriented at 90° with respect to the grooves of the other side, as described in U.S. Pat. No. 4,175,165. More particularly, the cathode (positive) compartment where water is formed and the presence of liquid condensate is more likely to occur, is characterized by the grooves being kept in the vertical direction to allow for the best draining. In the fuel cell made by a multiplicity of cell elements, each of said cell elements comprises a unitary electrodes-membrane structure rigidly pressed between the two sides of the two adjacent bipolar plates. In particular, as the grooves are crossed at 90° the areas with a remarkable contact pressure are those areas where the grooves are superimposed and more particularly they are formed by a matrix consisting of squares having a side equal to the width of the crest of the grooves and a pitch equal to the width of the "valleys" of the grooves. As a consequence the distribution of current and the withdrawal of heat, certainly localized in the areas of greater contact pressure, may be made sufficiently homogeneous only by using very thin grooves and increasing as much as possible the transversal electrical and thermal conductivity of the electrodes. Therefore, the production costs of the bipolar plates are rather high in consideration of the need to mechanically work the surfaces in an accurate way to obtain the grooves and to ensure the necessary planarity required by a substantially rigid system wherein the only element at least partially provided with resiliency is the electrodes/membrane structure. The type of required machining, scarcely compatible with mass production, strongly limits the dimensions of the bipolar plates to values capable only of permitting the production of small-size electric power systems, such as are necessary for electric transportation, but certainly too small for other important applications which foresee the on-site stationary generation of electric power, such as required for local electric generators for mechanical workshops. The need to limit the costs due to the machining has forced the choice towards materials capable of being molded or extruded, in particular mixtures of graphite and polymeric binders as clearly described in the aforementioned U.S. Pat. No. 4,175,165.

As the bipolar plates must exhibit a sufficient electrical and thermal conductivity, the content of polymeric binder mixed to the graphite has to be maintained to a minimum which however must be able to assure the necessary moldability. As a consequence the toughness of the bipolar plate is not too high, certainly not to be compared with that typical of metallic materials. Further, a permeability to gases, even if minimum, cannot be excluded. Therefore, obvious objections as to the intrinsic safety of fuel cells equipped with graphite bipolar plates arise relating to the resistance to mechanical shocks and the possible release of hydrogen, in particular when operating under pressure. On the other hand, the metals which are usually considered, that is titanium, niobium, tantalum (known as valve metals, that is capable of forming with time a protective oxide which is electrically insulating), stainless steels and superalloys, such as the various types of Hastelloy® grades are characterized by high cost, high specific densities and limited thermal and electrical conductivity. Further, at least the valve metals must be provided with an electroconductive coating capable of maintaining a low electrical resistivity, said need further increasing the already high costs. It is further possible that the design with grooves may bring to anomalous operation, as the distribution of gas takes place only longitudinally along the grooves, without any appreciable transversal mixing.

As regards the electrodes, the need for a high electrical and thermal transversal conductivity reduces the selection to a few types and the use of unitary electrodes/membrane structures involves a further production step of heat-pressing. This step is doubly expensive in terms of manpower and necessary equipment, such as high-power presses, with a controlled temperature of the plates and with quite strict planarity requirements.

A constructive modification disclosed by U.S. Pat. No. 4,224,121 comprises the addition of one or more metal meshes between the grooved bipolar plate and the electrodes/membrane unitary structure. This arrangement may improve the electric current distribution if at least the mesh in contact with the surface of the electrodes has a fine mesh size, even if this does not accomplish the final purpose of a complete homogeneity in the distribution also at a microscale level. In fact, the privileged areas are those subjected to a higher contact pressure corresponding to the intersections of the grooves. The addition of a package comprising a certain number of meshes, furthermore, provides the system with a certain resiliency and thus the planarity of the bipolar plates is a less strict requirement.

A bipolar plate design which avoids the complications of the mechanical working required for the grooves foresees the use of undulated sheets, optionally perforated, used for electrical contact between the surfaces of the electrodes and those of the planar bipolar plates, as described in DE 4120359. The undulated sheets may be welded to the bipolar plates or to the surface of the electrodes or to both. In a simpler and less expensive embodiment, the undulated sheets are simply pressed between the bipolar plates and the unitary electrodes/membranes structures. In this last case the two sheets on the sides of each single electrodes/membrane structure must necessarily be positioned crossing the respective undulations and the areas with a substantial contact pressure are those where the undulations are superimposed. The devices incorporating the above mentioned undulated sheets are substantially affected by the same shortcomings as discussed for the grooves concerning the current and gas distribution, and more severe shortcomings as regards the heat removal considering the reduced thickness of the sheets necessary to ensure for a certain resiliency. It is also evident that the use of undulated sheets requires that electrodes and membrane form unitary structures which may be obtained as above illustrated by heat pressing.

A further construction solution described by the prior art foresees the use of porous sheets of sinterized metal, directed to act at the same time as current and gas distributors. In this case the cell element to be formed by the unitary electrodes/membrane structure pressed between two sheets of sinterized metal, in turn is pressed between the two planar bipolar plates, as described in DE 4027655.C.1.

In an alternative embodiment, the unitary structure is formed by a membrane and one electrode only; the second electrode is applied as an electrocatalytic coating onto the surface of a sinterized metal sheet. The cell element is therefore formed by the electrode/membrane unitary structure, a first sheet of sinterized metal in contact with said electrode, and a second sheet of sinterized metal having an electrocatalytic coating applied on one side thereof in contact with the face of the membrane without the electrode, the whole package inserted between two bipolar plates.

As the sinterized metal sheets are substantially rigid, the unavoidable loss of planarity of the bipolar plates may be only compensated by deformations of the membrane, which is the weaker element from a mechanical resistance standpoint. The membrane consequently is strongly stressed and may give rise to defects, in particular the presence of geometrical local irregularities, such as protruding peaks of the sinterized metal sheet and internal porosities of the membrane itself. This negative behaviour may be avoided only with a particularly accurate mechanical flattening of the surfaces of the bipolar plates. Further, the void ratio of the sinterized metal sheets is normally low and therefore the flow of gases through said sheets involves high pressure drops. As a consequence, the sinterized metal sheets may be used as current distributors to substitute the meshes of U.S. Pat. No. 4,224,121 but not as gas distributors. Therefore it is still necessary to use bipolar plates provided with grooves, with all the aforementioned problems connected with the mechanical working and the relevant costs.

The problems above described affect also other types of electrochemical cells, equipped with electrodes fed with hydrogen or oxygen, similar to those used for fuel cells. Typical examples are electrochemical cells for the concentration of hydrogen or oxygen or for the electrolysis of salt solutions with gas depolarized electrodes.

BRIEF DESCRIPTION OF THE INVENTION

It is the main object of the present invention to provide for an improved electrochemical cell, such as a fuel cell, capable of overcoming the problems and shortcomings of the prior art. In particular, the functions of transmission of electric current through the cell elements, the release of heat towards the external environment, the distribution of electric current to the electrodes and membranes, the removal of heat from the electrodes and membranes and the distribution of the reactants and products are performed by distinct components, in particular bipolar plates for the first two, porous electroconductive collectors for the others. In view of this splitting of functions, the bipolar plates may have planar surfaces, without grooves. Therefore, the electrochemical cells of the present invention comprise bipolar plates preferably made of aluminum, titanium or alloys thereof, obtained by cheap mass production techniques, such as cutting from commercial sheets or casting in suitable molds. In particular, the bipolar plates do not require either mechanical flattening of the surface or coating with an electroconductive protective film. The bipolar plates of the present invention are used in combination with collectors provided with deformability and residual resiliency and capable of exerting high pressure in the areas of contact both with the electrodes and with the bipolar plates. The collectors of the present invention are further characterized by high porosity and therefore advantageously act also as distributors for the reactants and products. In consideration of their high electrical and thermal conductivity, said collectors are capable of withdrawing heat from the membranes and electrodes and efficiently transmitting it to the bipolar plates provided with means for releasing the same. These and other characteristics of the present invention will be better illustrated in the following detailed description and relevant examples, which are not to be considered in any case as a limitation thereof.

The present invention is particularly suitable for the construction of improved cell elements for electrochemical membrane cells, in particular for low-temperature fuel cells, more particularly ion-exchange membrane fuel cells. Said cells of the present invention are fed with reactants which may be gases containing hydrogen and oxygen, respectively to the anode compartment (negative polarity) and cathode compartment (positive polarity) of each cell element and the products are both gases and liquids, such as water. As will be clear to the experts in the art, the present invention may be useful also for fields other than fuel cells, in particular for water electrolysis carried out directly on pure water, without electrolytes, also as steam, for the electrochemical concentration of hydrogen and oxygen from gaseous reactants containing the same even in reduced percentages, for the production of oxygen peroxide by reduction of oxygen and for the electrolysis of various solutions with gas depolarized anodes or cathodes, when said processes are carried out in cells comprising cell elements having a structure similar to that of the cell element of the present invention.

BRIEF DESCRIPTION OF THE DRAWINGS

For a better understanding of the present invention, reference is made to the appended drawings, wherein the same elements are indicated by the same reference numeral. In particular.

DETAILED DESCRIPTION OF THE INVENTION

Figure 1:
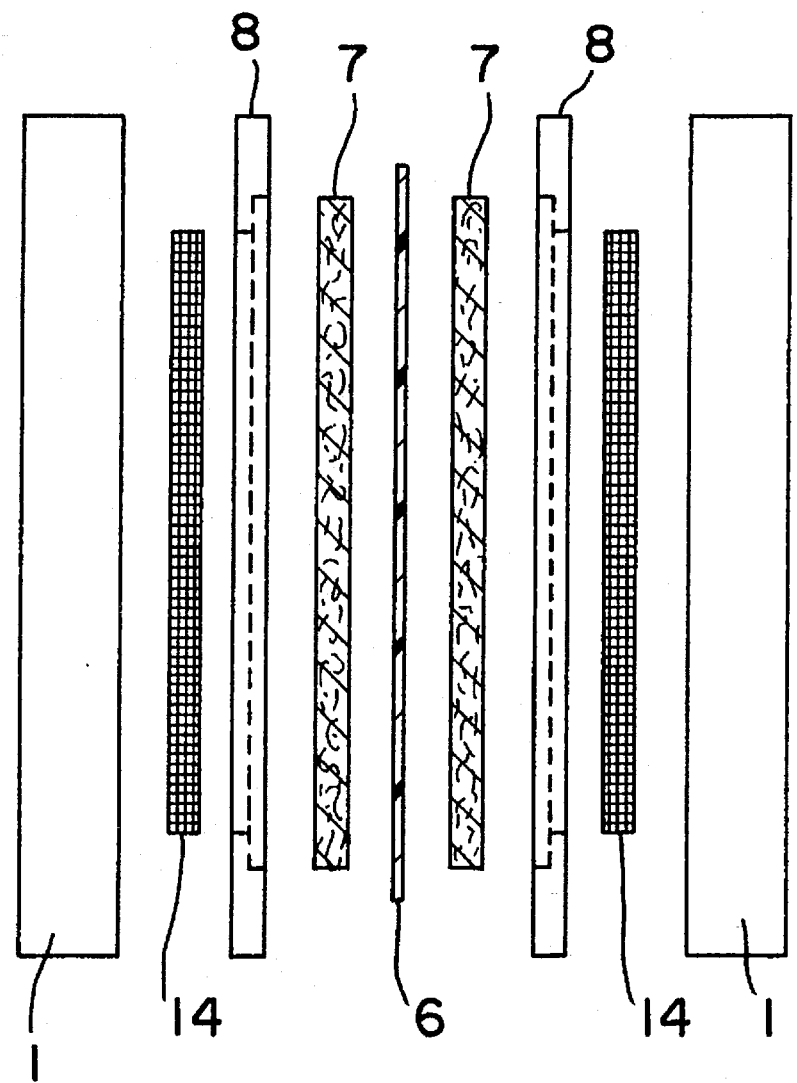
FIG. 1 is a cross-section of a cell element of a cell according to the present invention.

With reference to FIG. 1, the cell element of a cell of the invention comprises a pair of bipolar plates (1), a pair of collectors (14), a pair of gasket-frames (8), a pair of electrocatalytic electrodes (7) and an ion exchange membrane (6).

Figure 2:
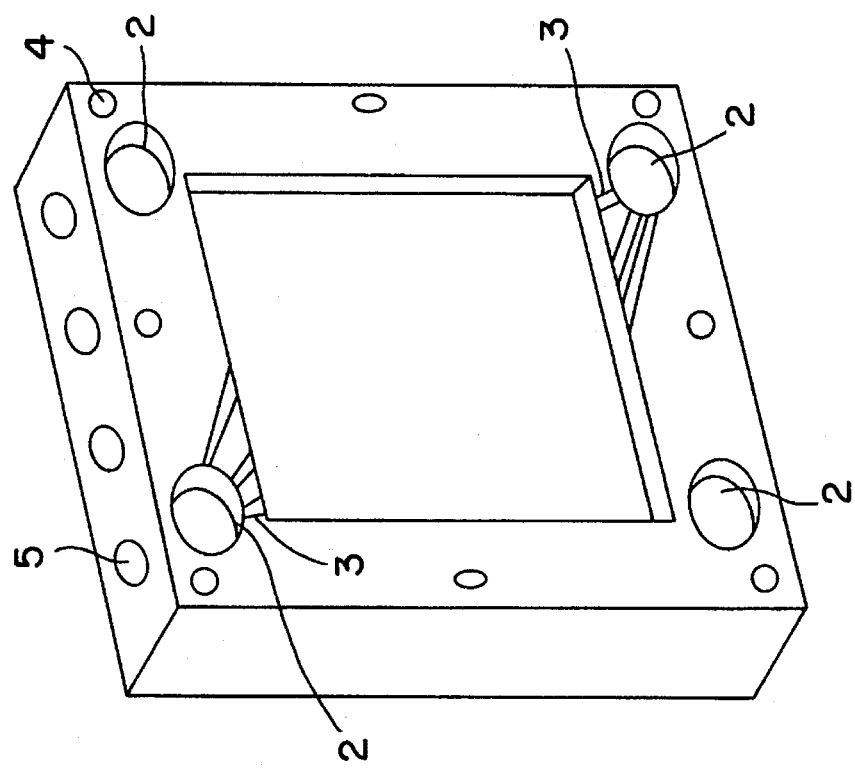

With reference to FIG. 2, the bipolar plate (1) is made of a metal plate which may have a flat surface in the area of contact with the collector (14). The peripheral frame area of the bipolar plate (1) is provided with holes (2) and optionally with distribution channels (3) for the inlet and outlet of the gases, holes (4) for the passage of the tie-rods (not shown in the figure) and optionally internal ducts (5) for the passage of a suitable cooling means. The dimensions of the bipolar plate are therefore dictated by the need to contain a certain active area of membrane (6) and electrodes (7) with the relevant collectors (14), as well as the holes (2, 4) and channels (3). The main characteristic of the bipolar plates of the present invention is the possibility of being produced in a great number of pieces with reasonable costs by cutting of commercial sheets or by casting in suitable molds, without any further mechanical flattening of the surface. The bipolar plates may be made of aluminum, titanium or alloys thereof, without the need for an electroconductive protective film. This last aspect will be illustrated in further detail in the following description. Obviously other metals or alloys may be used, such as other valve metals (niobium, tantalum), stainless steels, also high-alloys steels, nickel-chromium alloys, although less cost-effective and heavier due to the higher specific density of these materials. When the construction material is aluminum or alloys thereof, the high thermal conductivity permits withdrawal of the heat produced during operation of the cell by cooling of the peripheral part of the bipolar plates only. For this reason the peripheral part is suitably enlarged and the heat removal may be carried out by forced circulation of air or other cooling means (not shown in the figures). According to this embodiment, the bipolar plates (1) made of aluminum or alloys thereof are not to be provided with internal ducts (5), with much simpler construction and a substantial reduction of the costs.

Figure 3:
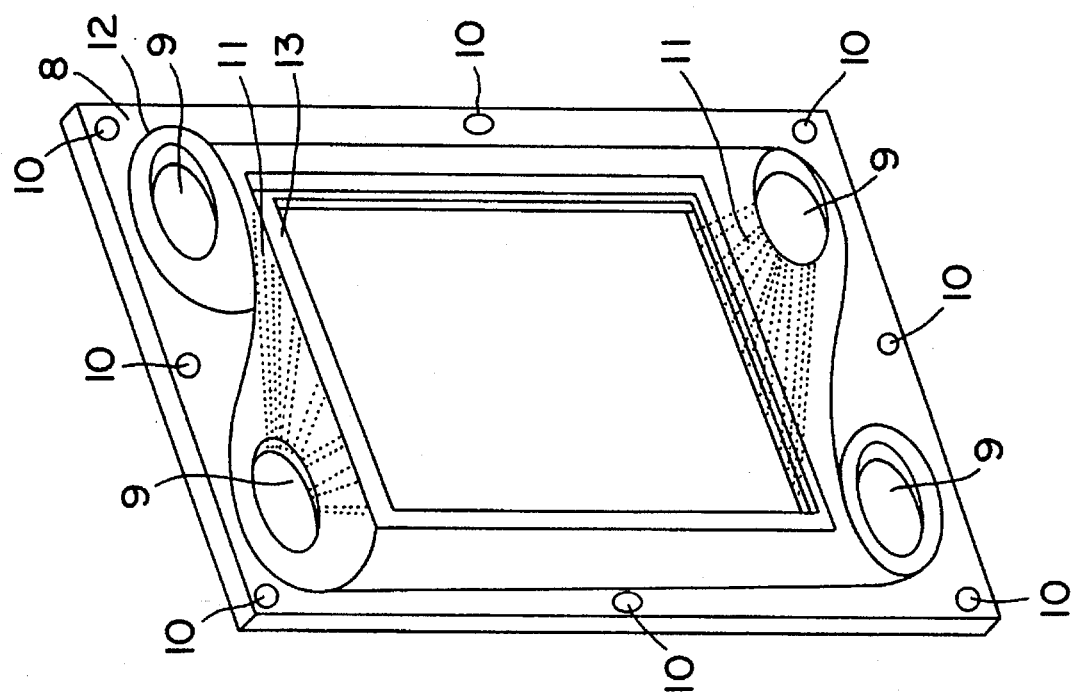
FIGS. 2 and 3 are axonometric views of details of the cell elements of the present invention.

In FIG. 3 the gasket-frames (8) comprise holes (9) for inlet and outlet of the reactants and products, fitting with the holes (2) of the bipolar plates (1), and optionally holes (10) for the passage of the tie-rods. The holes (10) are not necessary in a possible alternative embodiment where the corners are rounded off. The holes (9) are connected to suitable channels (11) cut out in the thickness of the gasket-frame and directed, coupled with channels (3), to uniformly distribute and collect the reactants and the products inside the cell. Although not compulsory, preferably the products outlet should be localized in the lower part to permit an easier purging of the condensate water which may be formed in the cell during operation.

The two faces of the gasket-frame may be non equivalent as, while the one in contact with the electrodes (7) and the membrane (6) may be flat, the one in contact with the bipolar plates is provided with channels (11) as aforementioned and with ribs (12), that is linear protrusions directed to ensure the necessary sealing to prevent gases from venting outside or mixing inside the cell. The sealing on the electrode side is ensured by the intrinsic resiliency of each gasket-frame/membrane pair. For this reason the gasket-frame is made of an elastomeric castable material. The required resiliency must be sufficient to permit a safe sealing under non-excessive mechanical load to avoid that deformation under compression may obstruct channels (3) and (11) and that the membrane be excessively stressed in the peripheral area. The thickness of the gasket-frame is dictated not only by mechanical considerations but also by the need to define an internal space available for the passage of gas. The gasket-frame of FIGS. 3 and 4 is further provided with a step (13) along the inside border to permit a ready housing of the electrode (7) and at the same time ensure a good protection of the membrane (6) from possible irregularities along the periphery of the collectors (14), such as residual peaks or burrs from the cutting of the pieces having the desired dimensions from commercial sheets.

Figure 4:
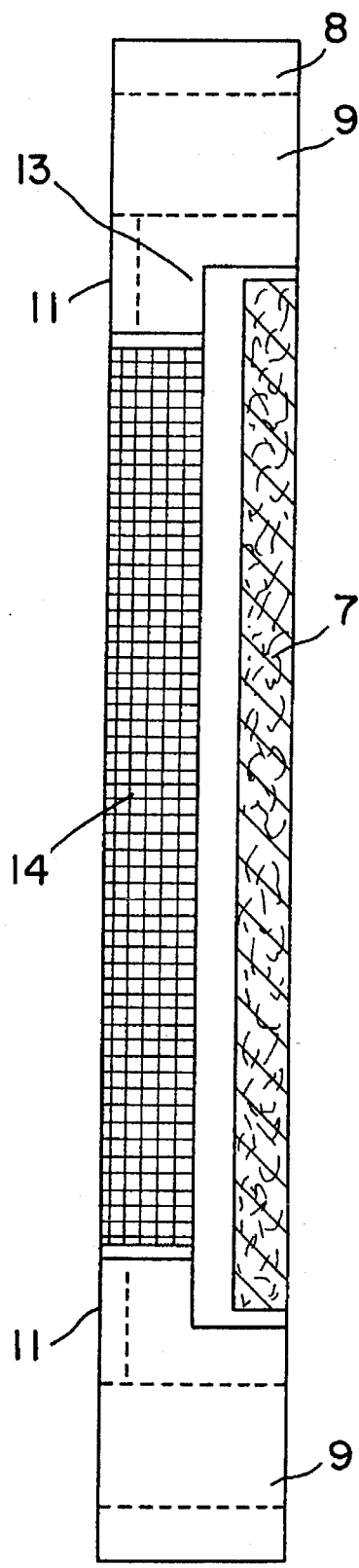
FIG. 4 is a cross-section of a gasket-frame coupled with an electrode and a collector.

FIG. 4 shows in more detail the assembly made of gasket-frame (8)/collector (14)/electrode (7). The collectors (14) of the present invention are directed to provide at the same time for:

a multiplicity of contact points with the electrodes to minimize the energy dispersions related to excessively long transversal paths of electric current inside the electrodes;

low values of the contact resistance with the surface of the bipolar plates preferably made of passivatable materials such as aluminum, titanium and alloys thereof, without protective electroconductive films;

heat transmission from the electrodes-membrane structures to the bipolar plates (1) optionally provided with ducts (5) where a cooling means flows;

longitudinal flow of reactants with small pressure drop and uniform distribution on the whole surface of the electrodes (7) due to the large possibility of transversal mixing;

easy drain of liquid water formed by condensation inside the collector during operation;

deformability with sufficient residual resiliency under compression, as required to compensate unavoidable planarity defects of the various components of the cell, in particular the bipolar plates which ideally are not subjected to precision mechanical finish of the surface. A certain degree of residual resiliency is also necessary to maintain under constant pressure the electrode/membrane structures to compensate the thermal expansion of the various components during start-up, shut down and electric load variations.

The above advantages are obtained by using collectors having a structure similar to a tridimensional network of metal wires, preferably fixed to each other in interconnecting points. By suitably tailoring the diameter of the wires and the distance between interconnecting points, an optimum void ratio may be easily obtained which should preferably be characterized by high values. The desirable dimensions of the voids should be sufficiently small in order to provide for the necessary multiplicity of contact points, but also sufficiently large to minimize capillary phenomena which would pose problems for the release of water condensate. Said phenomena can be further reduced if the network of metal wires and the channels (3 and 11) are made hydrophobic, for example by immersion in a solution containing a suitable hydrophobic agent followed by drying. A particularly preferred solution is an emulsion of polytetrafluoroethylene particles. Tridimensional networks of the above illustrated type are the mattresses described in U.S. Pat. No. 4,340,452 for use in electrolysis cells to ensure electrical continuity between a rigid current distributor and an electrode made of a thin sheet, in the presence of an electrolyte having high conductivity with moderate current density. Under these conditions optimum results are already obtained with modest pressures applied to the collector (tens-hundreds of grams per square centimeter) and with collectors consisting of a tridimensional network having relatively spaced apart interconnecting points (some millimeters).

Preferably these mattresses are metal-wire fabrics or screens wherein the wires form a series of coils, waves, crimps or other undulating contours. More preferably the mattress consists of a series of helicoidal cylindrical spirals of wire whose coils are mutually wound with the one of the adjacent spiral in an intermeshed or interlooped relationship.

In the present case it has been found that for the best performance the voids of the network must be such as to leave marks with dimensions in the range of 0.1–3 mm on a pressure sensitive paper while the pressures applied to the bipolar plates are indicatively comprised between 0.1 and 10 kg/cm$^2$. In an alternative solution, the tridimensional network may be further characterized by a surface containing the terminal sections of at least part of the metal wires: this feature compensates high localized pressures in very close limited-area points and therefore low values of the contact resistance.

Figure 5:
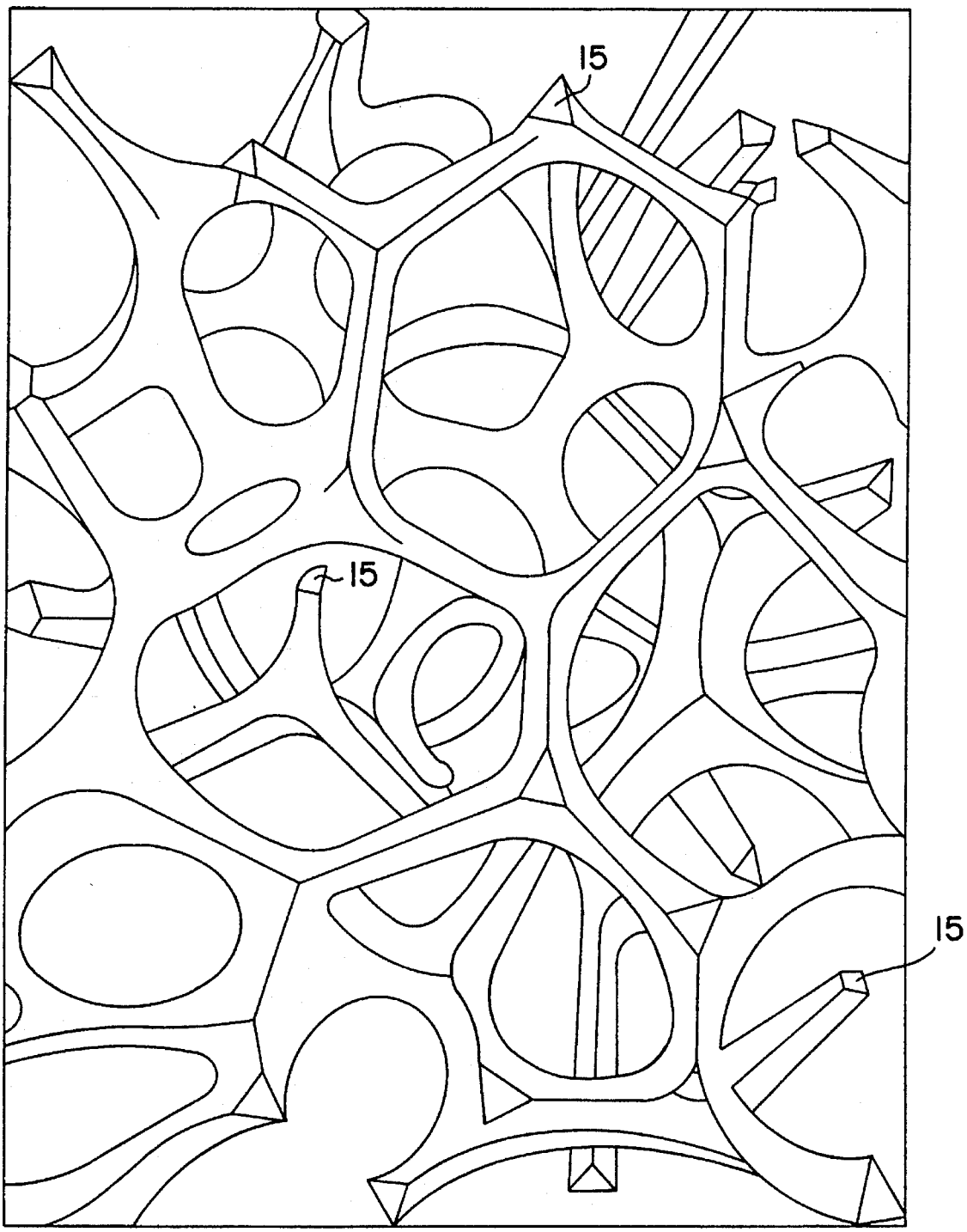
FIG. 5 is an axonometric view of a collector of the present invention.

In FIG. 5 the collector (14) is represented by a network with a surface provided with terminal sections (15), the efficiency of which has been demonstrated by electric resistance measurements carried out on assemblies simulating a cell element of the cell of the invention comprising two planar plates in aluminum alloy obtained by casting without any further mechanical finish, two collectors made in nickel, 2 mm thick, having a number of voids equal to 100/cm$^2$ (average dimension of the voids: 1 mm), two electrodes commercialized under the trade name of ELAT by E-TEK, U.S.A., holding inbetween a Nafion® 117 membrane supplied by Du Pont, U.S.A. The measured electrical resistances were in the range of 100–5 milliohm/cm$^2$, with pressures of 0.1–80 kg/cm$^2$ respectively applied to the aluminum plates. The measured values are kept constant even maintaining the assembly in a steam atmosphere at 100° C., as may happen during real operation.

Similar results have been obtained with metal plates made of titanium. The electrical resistances, measured under the same conditions with the same assemblies, without the collectors of the present invention, showed values comprised between 200 and 1000 milliohm/cm$^2$, absolutely unacceptable for a cell of industrial interest. The fact that the electrical resistance is surprisingly low and stable with time also in the presence of steam at 100° C. demonstrates that, contrary to what is known in the art, the bipolar plates may be made of aluminum, titanium or alloys thereof, without electroconductive protective coatings when used in connection with the collectors of the present invention. As it is known that aluminum, titanium and alloys of the same are coated with time by a film of an electrically insulating oxide, it may be assumed, without binding the present invention to any particular theory, that the high pressure localized in the limited-area contact points between the bipolar plates and the collectors of the present invention causes a rupture of this film or prevents its growth. Said contact pressure is probably about one order of magnitude higher than the pressure exerted on the bipolar plates.

Further, as already said, the bipolar plates may be advantageously used as such after casting or cutting from industrial sheets, without any need of subsequent mechanical flattening. This result is probably ensured by the deformability of the collector and by its residual resiliency, which compensates for possible deviations from planarity, typical of unprocessed production pieces. As the deformability of the collectors of the invention is relatively small at the pressure normally applied to the bipolar plates (in the order of some percent fractions of the thickness), it may be assumed that also the electrodes contribute to compensating the planarity deviations of the bipolar plates. In particular, to maintain the stresses on the membranes within acceptable values, the electrodes must exhibit a significant deformability. For this reason, it has been found that the best results in terms of absence of mechanical damage to the membranes are obtained when the electrodes comprise a deformable layer, such as carbon cloth. The bipolar plates may be of both the grooved and flat type, the last one being preferred in view of the substantially lower manufacturing cost. As regards the structure of the collector of FIG. 5, this tridimensional network may be obtained starting from an expanded foam having open cells in plastic material, such as polyurethane, which is initially pre-treated to obtain a certain electrical conductivity (for example vacuum metallizing or metal deposition by means of electroless baths as known in the art or pyrolysis under inert atmosphere or vacuum to form carbonaceous material, optionally partially graphitized). The material, thus pretreated, is then subjected to galvanic deposition of the desired metal or alloy, for example nickel, copper or alloys thereof with other metals, up to obtaining the desired thickness. The voids of the material advantageously have dimensions comprised between 0.1 and 3 mm and the diameter of the metal wires varies from 0.01 to 1 mm. Reference numeral (15) in FIG. 5 indicates the terminal sections of the metal wires which, as above illustrated, ensure for a multiplicity of contact points with a high localized pressure in the small areas represented by the cross-sections of such terminal sections. The thickness of the collector, as will be clear from FIG. 1, is given by the thickness of the gasket-frame decreased by the thickness of the electrode. The thickness of the collector is generally comprised between 0.5 and 5 mm and more preferably between 1 and 2 mm. The network of FIG. 5 is described in EP publication 0266312.A1 which claims its use as an expanded electrode for electrolysis of aqueous diluted solutions of metal ions and in U.S. Pat. No. 4,657,650 which describes its application as the external electrical contact for the connection of elementary cells in an electrolyzer.

Optionally, the tridimensional network (reticulated material) according to the present invention may also be used in connection with a metal mesh or graphitized carbon mesh interposed between the reticulated material and the electrode/membrane structure. In this double-layer structure of the collector, the mesh, which may be particularly fine (for example meshes apertures smaller than 1 mm), ensures for the necessary multiplicity of contact points with the electrodes, while the reticulated material may be more freely selected, for example with particularly large voids in order to allow for the maximum percolation of the water which may have condensed inside. The use of the mesh ensures a higher protection of the membrane in the case the reticulated material presents a surface with particularly enhanced spikes.

In a further embodiment, the collector of the present invention is simply made of one or more superimposed meshes, made of woven metal wire indicatively having mesh apertures smaller than 3 mm, preferably smaller than 1 mm, in order to ensure a multiplicity of contact points between the electrodes and the bipolar plates. High contact pressures, particularly useful on the bipolar plate side, are obtained when the wire used for fabricating the meshes has a quadrangular cross-section but also other polygonal cross-sections may be used. In this case the longitudinal edges of the wire, in the superimposed points, form a particularly useful array of asperities which imprint the metal surface of the bipolar plate. An alternative embodiment of the mesh which is as well advantageous is represented by an expanded metal obtained by pre-cutting of thin sheets and subsequent expansion. In this way a mesh is obtained with apertures having various forms, for example rhomboidal, the portions of the metal which define the mesh apertures being rotated with respect to the plane of the sheet itself. Therefore when the expanded metal sheet is pressed against planar surfaces, the peaks of said rotated portions of metal become the areas of contact. At least one pair of the above described meshes is used in order to provide for higher resiliency and deformability, permeability to gaseous reactants and percolation of the water condensate. For this last instance, the meshes may be characterized by different apertures, in particular a fine mesh size for the one in contact with the electrodes and a coarser mesh in contact with the bipolar plate.

A further embodiment of the present invention foresees the concurrent use of the above described collectors of the invention and in particular the reticulated material on one membrane side and one or more meshes, optionally having different mesh sizes, on the other side.

Further, the collector of the present invention made either of reticulated material or of superimposed meshes may be used on one side of the membrane only, while on the other side a rigid, conductive and porous material is used, such as a sinterized metal layer. This must be sufficiently thin in order to comply with the profile of the bipolar plate, which is not perfectly planar, under the applied pressure. The void ratio and the dimensions of the pores of the sinterized metal layer must be of the type already described for the collectors of the invention in order to permit the flow of reactants and products, percolation of the water condensate and multiplicity of contact points with the electrodes and bipolar plates. The metal forming the collector of the present invention must resist possible aggressive conditions which may be particularly severe when the cell is fed with air on the positive pole compartments and/or with a mixture of carbon dioxide and hydrogen on the negative pole compartments. Under these conditions possible water condensates are acidic. Taking into account both this possibility and the fact that the operating temperature is higher than the room temperature, most advantageously the metal is stainless steel of the 18 chromium-10 nickel type, preferably high-alloy steel, nickel-chromium alloys, titanium, niobium, or other valve metals. The collectors and the bipolar plates of the invention may be optionally coated with an electroconductive protective film, for example made of platinum group metals or oxides thereof. Alternatively the protective film may be made of conductive polymers of the type comprising intrinsically conductive materials such as polyacetylenes, polypyrroles, polyanilines or the like or plastic materials containing conductive powders (for example graphite powder).

Figure 6:
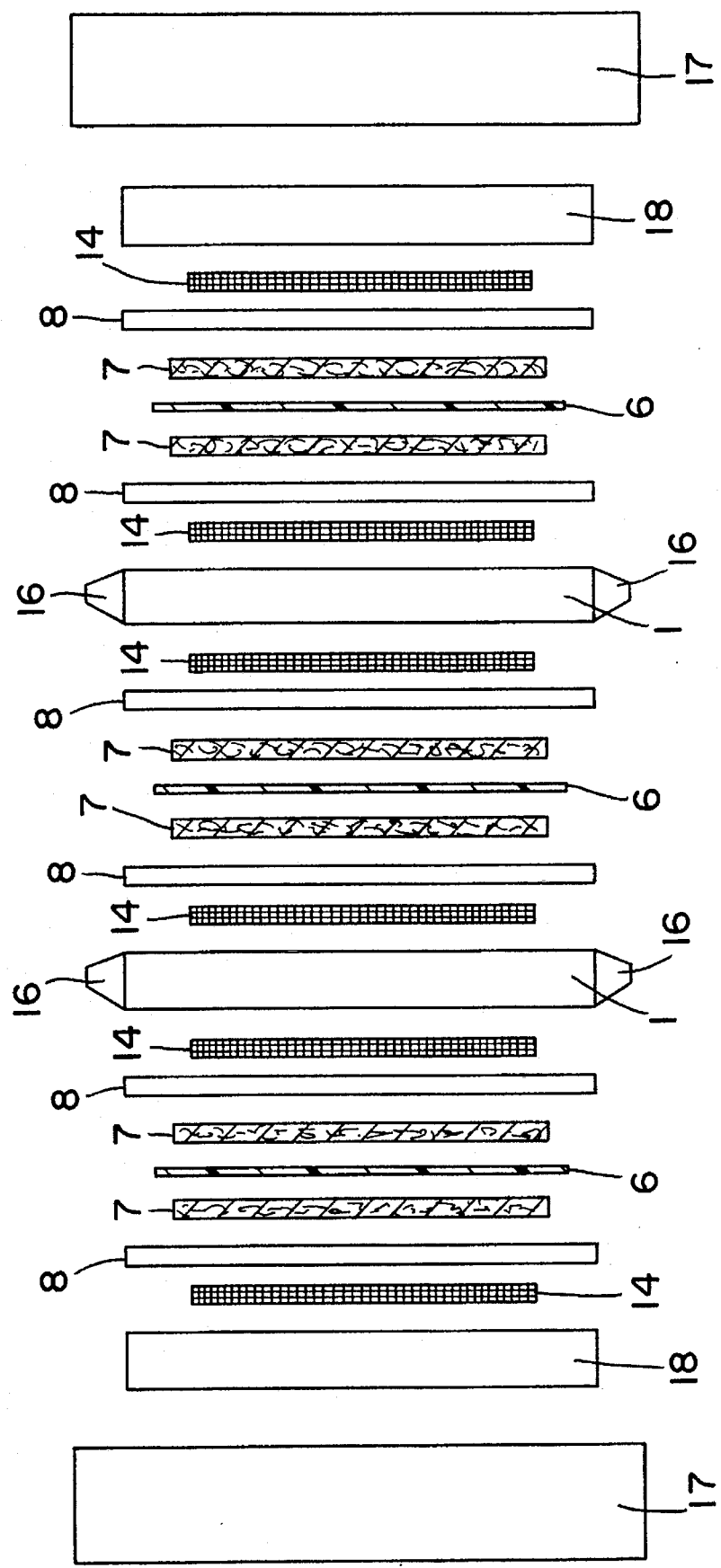
FIG. 6 is a cross-section of an embodiment of the cell of the present invention.

FIGS. 1 and 6 clearly illustrate that each pair of bipolar plates (1) in aluminum or other passivatable material or alloys thereof maintains pressed inside a pair of collectors (14) of the invention, a pair of electrodes (7) and a membrane (6). Said electrodes, as known in the art, before insertion between the bipolar plates and the collectors, are bonded to the membrane under pressure and heating, possibly after applying to the surface of the electrodes a suspension or solution containing the polymer forming the membrane, with the aim to facilitate both the adhesion of the electrode to the membrane as well as the formation of a large area of triple contact between gas, membrane and catalytic particles of the electrodes. If the membranes and the electrodes are bonded together to form a unitary structure, the bipolar plates and the collector of the invention however do not produce any appreciable improvement of the cell performance with respect to the teachings of the prior art. Therefore, the advantages of the present invention in this case are limited to higher simplicity and lower production costs, in particular for the bipolar plates made of aluminum or other passivatable metals without any protective coating.

It has been surprisingly found that the bipolar plates and the collectors of the present invention obtain optimum cell performances also when the electrodes, contrary to what is taught in the art, are not previously bonded to the membrane, which obviously reduce the production costs and to limit the risk of damaging the delicate membranes. Without binding the validity of the present invention to any particular theory, it may be assumed that the multiplicity of contact points and the high pressure obtained on said points, typical of the above mentioned collectors, are capable of maintaining a high percentage of the area of the electrodes in intimate mechanical contact with the membrane. As a consequence, the number of catalytic particles embedded in the membrane surface (triple contact area) is analogous in the case of the present invention with the electrodes only laying onto the membrane and in the case described in the prior art with the electrodes bonded to the membrane. Conversely, it has been found that with collectors consisting of undulated sheets or simply grooved bipolar plates, as known in the art, the performances are acceptable only when the electrodes are bonded to the membrane. As above discussed, with these collectors the contact areas under sufficiently high pressure are limited only to the crossing points of the grooves or undulations and therefore involve a limited portion of the electrodes surface, which is the only one to be kept in contact with the membrane. In the remaining portion of electrode surface, the contact pressure with the membrane is nil and during operation the differential expansion of the membrane and the electrodes may bring about separation of the surfaces. This remaining portion, therefore, does not contribute in any way to the performance of the cell. These considerations are to explain why the prior art describes bonding of the electrodes to the membrane as an essential factor for a good performance of the cells with collectors provided with grooves or undulations.

The optimum results obtained according to the present invention with electrodes not bonded to the membrane are probably due also to a second characteristic of the collectors, that is deformability and residual resiliency under compression. This characteristic compensates for the small deviations from planarity of the planar bipolar plates not subjected to mechanical flattening of the surface.

The compensation of planarity defects maintains a uniformly distributed contact over all the surface of the bipolar plates, of the electrodes and membranes, ensuring thus optimum performances by a homogenous distribution of current. As already said, in order to maximize the deformability property, advantageously the electrodes (7) may have a deformable structure. Therefore, even if the electrodes may be made as taught in the art, in the form of porous sheets obtained by sinterization of a mixture comprising powders of electroconductive and electrocatalytic materials, a polymeric binder and optionally agents suitable for favouring the formation of pores, advantageously they are made of a porous deformable layer of conductive material. Onto said layer, a suspension is applied by spraying or brushing or any similar technique. The suspension comprises a liquid vehicle, powders of electrocatalytic and electroconductive materials and polymeric binder, optionally comprising ionic groups, with hydrophobic or hydrophilic characteristics, directed to control the wettability of the system. The porous layer is then dried and subjected to a thermal treatment directed to mechanically stabilize the applied material. Suitable layers are made of carbon cloth or paper, optionally graphitized. The carbon cloth is preferred in view of the higher deformability and flexibility which facilitates handling and assembling into the cell. Products of this type, containing platinum as the catalyst and polytetrafluoroethylene as the polymeric component are commercialized by various companies, for example E-TEK, U.S.A. under the trade name of ELAT. These products may be utilized as such or after painting with a suspension or paint containing a ionic polymer similar to that forming the membrane. Further types of porous layers are made of metal sinterized layers or fine screens or multilayer clothes, for example made of various types of stainless steels, high-alloyed steels, or alloys of nickel, chromium and titanium. Generally multilayer cloths are best preferred in view of their deformability. In another embodiment, the above layers, when made of a multi-layered cloth, may act at the same time as collectors and electrodes. In this case, the aforementioned suspension containing the electrocatalytic particles is applied only to the surface to be put in contact with the membrane.

FIG. 6 describes the assembly made of a multiplicity of cell elements of FIG. 1 to form the cell of the invention, comprising the bipolar plates (1), collectors (14), electrodes (7), gasket-frames (8), ion exchange membranes (6), endplates (18), pressure plates (17). The bipolar plates (1) are provided with external connections (16) which, once connected, short-circuit two or more bipolar plates of the cell elements in the case of malfunctioning. The same result could be obtained with bipolar plates provided with recesses of suitable form. This type of action permits the safe operation of the cell comprising a high number of cell elements connected in electrical series and it is therefore extremely helpful from a practical point of view. It must be further noted that shortcircuiting is efficient only if the ohmic drop in the shortcircuited bipolar plates transversally crossed by electric current, is negligible: this is obtained with bipolar plates made of highly conductive materials such as aluminum or alloys thereof.

The following examples, which do not constitute in any case a limitation of the objects of the present invention, will better explain the present invention. For convenience sake the examples have been limited to the case of the fuel cells.

EXAMPLE 1

4 fuel cells, each one made of three cell elements comprising two pressure plates (17 in FIG. 6), two end-plates (18 in FIG. 6) and two bipolar plates (1), three pair of collectors (14), three pairs of electrodes (7), three membranes and three pairs of gasket-frames (8), were assembled as illustrated in FIG. 6. The general operating conditions, kept constant during all the tests, were as follows:

dimensions of the electrodes and collectors: 10×10 cm$^2$ membranes: Nafion® 117, supplied by Du Pont, U.S.A.

membrane active area: 10×10 cm$^2$ moulded gasket-frames, having inside dimensions of 10×10 cm$^2$ and outside dimensions of 20×20 cm$^2$, a thickness of 2 mm, provided with holes (9) and (10), channels (11), ribs (12) 0,1 mm high, internal step (13) 0.5 mm deep with an external dimension of 11×11 cm$^2$, as shown in FIG. 3. Construction material: Hytrel® commercialized by Du Pont, U.S.A.;

bipolar plates and end plates with external dimensions of 20×20 cm$^2$, provided with holes (2) and (4) and other characteristics as specified hereunder.

feed to the anode (negative) compartments made of pure hydrogen at 2 atm, pre-heated and pre-humidified at 70° C. in an external saturator, the flow rate being doubled with respect to the stoichiometry of the reaction;

feed to the cathode (positive) compartments made of purified air at a 2.1 atm, pre-heated and pre-humidified at 50° C. in an external saturator with a triple flow rate with respect to the stoichiometry of the reaction;

operating temperature: 80° C.

total current: 50 Ampere, corresponding to a current density on the active area of the electrodes equal to 5000 Ampere/m2 total operation time for each test as indicated here after, but in any case comprised between 300 and 400 hours, with start up and shut down at the beginning and at the end of each working day.

Each fuel cell was equipped with a combination of the following alternatives:

A. bipolar plates and end plates in aluminum alloy, UNI 5076 type (Italian Standards), obtained by pressure die-casting having a thickness of 5 mm, provided with internal ducts for cooling (5) made of stainless steel of the 18 chromium-10 nickel type with an internal diameter of 3 mm and channels (3) as illustrated in FIG. 1 and 2

B. same bipolar plates and end plates as in A, the only difference being the construction material, titanium instead of aluminum alloys.

C. bipolar plates and end plates made of aluminum alloy, Anticorodal 100 TA16 type (Italian Standards) obtained by cutting from commercial sheets having a thickness of 3 mm, without inside cooling ducts (5) and channels (3). In this case the external dimension of the plates was increased to 30×30 cm$^2$ to permit cooling by forced air.

D. same bipolar plates as in C, but with the contact surface with the collectors coated with a chromium film obtained by galvanic deposition;

E. same bipolar plates as in C, but with the contact surface with the collectors coated with a film of a polymeric conductive film belonging to the group of polyaniline.

F. electrodes made of flexible conductive carbon cloth, coated on one side thereof with a film containing electrocatalytic platinum particles supported onto active carbon and a polymeric binder and on the other side with a hydrophobic porous and conductive film based on polytetrafluoroethylene, supplied by E-TEK, U.S.A. under the trade name of ELAT, 0.5 mm thick, with a platinum load of 0.5 mg/cm$^2$;

G. same electrodes as in F, with the further application of a polymer similar to that of the membrane on the side containing the catalyst, applied by brushing or spraying with a solution of a perfluorinated polymer containing sulphonic groups, commercialized by Solution Technology, U.S.A. under the trade name of Nafion Solution 5%

H. same electrodes as in G, wherein the flexible carbon cloth is substituted for a conductive carbon rigid graphite paper supplied by Toray, Japan, under the commercial trade name of TGHP 030;

I. same electrodes as in G, wherein the flexible carbon cloth is substituted for a multilayer cloth in stainless steel of the type 18 chromium-10 nickel-2 molybdenum;

L. collectors in reticulated material as shown in FIG. 5, made of an alloy of 50 chromium-50 nickel, having an average diameter of the pores of about 0.2 mm and a 2 mm thickness. Materials of this type are currently supplied by different companies and are conventionally called metal foam;

M. same collectors as in L, having an average diameter of the pores of about 1 mm N. same collectors as in L, having an average diameter of the pores of about 3 mm;

O. collectors consisting of 3 superimposed meshes made of 18 chromium-10 nickel stainless steel wire having a diameter of 0.3 mm forming meshes with apertures of 0.5×0.5 mm;

P. collectors consisting of 2 titanium expanded sheets having diamond shaped apertures with the major dimension respectively of 1 mm (expanded sheet on the electrode side) and 3 mm (expanded sheet on the bipolar plate side) obtained from a sheet 0.5 mm thick and coated with a platinum layer 0.3 microns thick formed by galvanic deposition;

Q. collectors consisting in a multilayer cloth obtained from a metal wire having a diameter of 0.15 mm made in stainless steel of the 18 chromium-10 nickel-2 molybdenum type, 2 mm thick under compression, commercialized by Costacurta, Italy;

R. collectors made of a layer of sinterized metal such as stainless steel of the type 18 chromium-10 nickel, 2 mm thick.

The average voltages referred to the cell element and expressed as Volts, are shown in Table 1, for fuel cells equipped with bipolar plates of the type A.

The temperature of the plates was controlled by forced circulation of demineralized water at 75° C.

TABLE 1

| electrode | F | G | H | I(**) |
|---|---|---|---|---|
| collector | | | | |
| L(*) | 0.65 | 0.7 | 0.7 | = |
| L | 0.6 | 0.7 | 0.6 | = |
| M | 0.6 | 0.7 | 0.6 | = |
| N | 0.55 | 0.65 | 0.6 | = |
| O | 0.6 | 0.7 | 0.65 | = |
| P | 0.6 | 0.7 | 0.6 | = |
| Q | 0.6 | 0.7 | 0.65 | 0.7 |
| R | 0.45 | 0.5 | 0.45 | = |
| L + P(***) | 0.6 | 0.7 | 0.6 | = |
| L + R(***) | 0.6 | 0.65 | 0.6 | = |

(*)data obtained with electrodes bonded to the membrane
(**)the multilayer cloth acts as electrode and collector at the same time
(***)collectors made of sinterized materials of the type R and superimposed expanded meshes of the type P installed in the anode (negative) compartments.

The data reported in Table 1 may be commented as follows:

the data obtained with electrodes bonded to the membrane (line L*) represent a comparison with the prior art. It is clear that pre-treatment of the electrodes with a polymer solution similar to that of the membrane allows for a definite improvement of the performances.

the multiplicity of contact points per unity of surface area is instrumental for an optimum performance. The tridimensional network of the type N, characterized by pores with an average dimension of 3 mm, is in fact constantly characterized by insufficient voltages.

the deformability of the collectors and electrodes is a key factor as demonstrated by the unsatisfactory voltages obtained with the sinterized materials (line R) and the rigid graphite paper used as a substrate for the electrodes (column H).

in the case of collectors made of sinterized material (line R), the unsatisfactory performances are also due at least to a partial flooding of the compartments (probably the cathode positive compartments) due to the water condensate formed during operation and retained by capillarity in the small pores of the sinterized material;

the optimum and stable voltage values, typical of all the tests, demonstrate that the electrical resistance between the collectors of the invention and the planar bipolar plates of aluminum alloys, without an electroconductive protective coating, is extremely reduced. This result is quite surprising in consideration of the fact that aluminum and alloys thereof are known to become coated with a natural electrically insulating oxide, in particular under heat in the presence of steam (typical operating condition of the fuel cell). A confirmation of this conclusion is given by the voltages quite similar to those obtained with bipolar plates coated with a chromium protective film (type D) and conductive polymeric material (type E).

EXAMPLE 2

The same test of Example 1, characterized by utilizing electrodes of the type G and collectors of the type R (sinterized material) was repeated after having made the bipolar plates, end plates and collectors hydrophobic by immersion in a suspension of polytetrafluoroethylene (commercialized by Du Pont under the trade name of Teflon 30N) followed by thermal treatment at 150° C. The voltages measured under the same testing conditions of Example 1 resulted comprised between 0.55 and 0.65 Volts. This improvement may be ascribed to the lower tendency of the sinterized material to retain water formed by condensation during operation.

EXAMPLE 3

The same cell of Example 1, characterized by the the presence of electrodes of the type G and collectors of the type L was subjected to repeated shortcircuiting of the second cell element by connecting by means of clamps the external connections indicated by reference numeral 16 in FIG. 1 The average voltages of the other cell elements did not change during the shortcircuiting periods and the shortcircuited cell element shortly reached the normal voltage once the clamps were disconnected. The maximum voltage between the bipolar plates of the shortcircuited cell element during shortcircuiting resulted in the range of 20–30 mV.

EXAMPLE 4

The influence on voltage of the different type of bipolar plates and end plates were examined by repeating the test of Example 1 using the electrodes of type G and the collectors of type L and substituting the cast bipolar plates and end plates in aluminum alloy (type A) for similar ones made of titanium (type B). Average voltages of the unitary elements comprised between 0.68 and 0.71 Volts were detected, substantially similar to those typical of the fuel cell equipped with bipolar and end plates in aluminum alloy. Similar results were obtained by further substituting the bipolar plates of the type B with plates in aluminum alloy of the type C. Cooling was carried out by forced circulation of precooled air fed through separated ducts located below each cell element.

EXAMPLE 5

A series of test was carried out to obtain further comparative data with the prior art. Two fuel cells were made of three cell elements comprising bipolar plates and end plates provided with grooves directed to act as current distributors and consisting respectively of graphite and aluminum alloy of the type UNI 5076. The bipolar plates and terminal plates were further provided with internal ducts for cooling.

The grooves were oriented in order to be crossed at 90° for each pair of facing sides of the bipolar and end plates.

The electrodes were of the type G of Example 1 and the membranes were of the type Nafion® 117. The fuel cell equipped with bipolar plates and terminal plates in graphite and with the electrodes bonded to the membrane was operated under the same conditions as in Example 1 and resulted characterized by the best average voltages referred to the cell elements measured in the various conditions reported in Table 1 (0.7 Volts). However, the same fuel cell, provided with electrodes of the type G not bonded to the membrane, showed quite unsatisfactory average voltages, comprised between 0.5 and 0.55 Volts, thus demonstrating that only the collectors of the invention, with their multiplicity of contact points, are capable of ensuring a satisfactory and extended continuity between the surfaces of the membranes and those of the electrodes, when these are not previously bonded.

As said above, the fuel cell, comprising grooved bipolar and end plates in aluminum alloy and electrodes of the type G bonded to the membrane, showed quite satisfactory performances at the beginning of the test. However, the voltages rapidly decreased to low values (0.4 Volts) in about a hundred hours, thus demonstrating that only the collectors of the invention are capable of maintaining the contact resistance within negligible values with time.

As a confirmation of this fact a further test was carried out with a fuel cell comprising grooved bipolar and end plates in aluminum alloy, electrodes of the type G (Example 1) not bonded to the membranes and collectors of the invention of the type M (Example 1). The voltage resulted satisfactory (0,60 e 0,65 Volts) and stable with time. Further, this embodiment resulted particularly efficient for draining the water condensate formed in the cathode (positive) compartments where the grooves of the bipolar and end plates were positioned in the vertical direction.

Various modifications of the cell of the invention may be made without departing from the spirit or scope thereof and it has to be understood that the present invention is limited only as defined in the appended claims.

We claim:

1. A fuel cell comprising pressure plates (17), bipolar plates (1) or end plates (18) made of metals, or metal alloys, provided with holes (2) for feeding the gaseous reactants and removing the products and the residual reactants, current collectors (14) permeable to gas flow, electrocatalytic porous electrodes (7) bonded to ion exchange membranes (6) before assembling of the fuel cell and gasket-frames (8) characterized in that said collectors (14) consist of a porous eletroconductive material having residual deformability and resiliency under compression and are provided with a multiplicity of limited area contact points said bipolar plates and the end plates are made of metals or metal alloys capable of forming a protective oxide.

2. The fuel cell of claim 1 wherein said bipolar or end plates (1,18) have an enlarged peripheral part for heat removal by cooling means.

3. The fuel cell of claim 1 wherein said collectors (14) provided with residual deformability and resiliency are a tridimensional network of metal wires, the surfaces of said network containing the terminal sections (15) of at least part of said wires.

4. The fuel cell of claim 3 wherein said tridimensional network has a porosity at least equal to 50% and a diameter of the metal wires comprised between 0.01 and 1 mm.

5. The fuel cell of claim 1 wherein said collectors (14) provided with residual deformability and resiliency consist in at least two superimposed meshes made of metal wires having polygonal cross-section.

6. The fuel cell of claim 5 wherein said meshes have a different mesh size with a finer mesh for the mesh in contact with the electrodes (7) and a coarser mesh for the mesh in contact with the bipolar or end plates (1,18).

7. The fuel cell of claim 1 wherein said collectors (14) have voids with dimensions comprised between 0.1 to 3 mm.

8. The fuel cell of claim 1 wherein said collectors (14) have a thickness comprised between 0.5 and 5.

9. The fuel cell of claim 1 wherein said collectors (14) are made of corrosion-resistant material selected from the group comprising stainless steels, high-alloy steels and nickel-chromium alloys.

10. The fuel cell of claim 1 wherein said collectors (14) and said bipolar or end plates (1,18) are made hydrophobic.

11. The fuel cell of claim 1 wherein said bipolar or end plates (1,18) have a planar surface.

12. The fuel cell of claim 1 wherein said bipolar or end plates (1,18) are obtained by molding or cutting of commercial sheets without further finish of the surface.

13. The fuel cell of claim 1 wherein said bipolar or end plates (1,18) are further provided with channels (3) for the distribution and for the removal of the reactants and products.

14. The fuel cell of claim 1 wherein said bipolar or end plates (1,18) are further provided with internal ducts (5) for cooling with a gaseous or liquid means.

15. The fuel cell of claim 1 wherein said metals or metal alloys capable of forming a protective oxide are selected from the group comprising aluminum, titanium, zirconium, niobium, tantalum and alloys thereof and stainless steels.

16. The fuel cell of claim 15 wherein the contact resistance between said bipolar or end plates (1,18) and said collectors (14) is comprised between 100 and 5 milliohm/$cm^2$ with a pressure exerted on said plates (1,18) comprised between 0.1 and 80 $kg/cm^2$.

17. The fuel cell of claim 1 wherein said gasket-frames (8) are made of castable elastomeric material and comprise holes (9) for the distribution and the removal of the reactants and products and a step (13) for the housing of said electrodes (7) and ribs (12) for sealing and separation of the reactants and products.

18. The fuel cell of claim 1 wherein said electrodes (7) are made of a porous, conductive layer provided with a surface containing a catalyst and a surface containing hydrophobic material.

19. The fuel cell of claim 18 wherein said layer is a flexible carbon cloth.

20. The fuel cell of claim 18 wherein said layer is a carbon paper.

21. The fuel cell of claim 18 wherein said layer is a flexible cloth of corrosion resistant metal selected from the group comprising stainless steels, high-alloy steels and nickel-chromium alloys.

22. The fuel cell of claim 18 wherein said electrodes (7) are further provided with a coating of a polymer having ion exchange characteristics applied onto the surface containing the catalyst.

23. The fuel cell of claim 1 wherein said bipolar or end plates (1,18) are provided with external connections or recesses (16) suitable for short-circuiting.

* * * * *